US011863865B1

(12) United States Patent
Gerber et al.

(10) Patent No.: US 11,863,865 B1
(45) Date of Patent: *Jan. 2, 2024

(54) AUTOMATED INSPECTION SYSTEM AND METHOD

(71) Applicant: UIPCO, LLC, San Antonio, TX (US)

(72) Inventors: Geoffrey Lee Gerber, Phoenix, AZ (US); Scott Evan Daly, San Antonio, TX (US); Danielle Elise Marie Vanica, Phoenix, AZ (US); Martie Ann Gutshall Kelley, Buckeye, AZ (US); Scott Michael Camarena, Phoenix, AZ (US); Harold Joy Ridley, Chandler, AZ (US); Matthew Ray Bartee, Mesa, AZ (US); Logan Thomas Davis, Bozeman, MT (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,978

(22) Filed: Nov. 16, 2022

Related U.S. Application Data (63) Continuation of application No. 17/462,091, filed on Aug. 31, 2021, now Pat. No. 11,546,507.

(51) Int. Cl.
*H04N 23/60* (2023.01)
*G06F 40/279* (2020.01)
*G06V 20/40* (2022.01)
*G11B 27/34* (2006.01)

(52) U.S. Cl.
CPC ........... *H04N 23/64* (2023.01); *G06F 40/279* (2020.01); *G06V 20/46* (2022.01); *G11B 27/34* (2013.01)

(58) Field of Classification Search
None
See application file for complete search history.

(56) References Cited

U.S. PATENT DOCUMENTS

| 9,767,410 | B1 | 9/2017 | Guevara |
| 10,210,577 | B1 | 2/2019 | Davis |
| 10,445,796 | B2 | 10/2019 | Ahroon |

(Continued)

FOREIGN PATENT DOCUMENTS

WO    WO 2013/140263 A3    9/2013

OTHER PUBLICATIONS

Non-Final Office Action dated Jan. 18, 2022 for U.S. Appl. No. 17/462,091.

(Continued)

*Primary Examiner* — Hung Q Dang
(74) *Attorney, Agent, or Firm* — Plumsea Law Group, LLC (57) ABSTRACT

A system and method that guides a user to record initial and final walkthrough videos, along with audio, of their rental property is disclosed. The embodiments also provide a system that can scan a lease for the rental property, as well as audio from a user's narration of the video, and extract and tag particular features of the video for efficient querying at a later time. The system can interpret portions of the lease that are relevant to particular items or components in the apartment (for example, major appliances) and guide the user to perform a comprehensive inspection of the items mentioned in the lease.

20 Claims, 8 Drawing Sheets (56) References Cited

U.S. PATENT DOCUMENTS

| | | |
|---|---|---|
| 11,055,797 B1 | 7/2021 | Carone |
| 2002/0069230 A1 | 6/2002 | Schubert |
| 2005/0144018 A9 | 6/2005 | Aptekar |
| 2005/0222861 A1 | 10/2005 | Silverman |
| 2011/0040692 A1 | 2/2011 | Ahroon |
| 2015/0032580 A1 | 1/2015 | Altermatt |
| 2015/0186988 A1 | 7/2015 | Skinner |
| 2019/0259388 A1 | 8/2019 | Carpenter, II |
| 2019/0392654 A1* | 12/2019 | Sato ........................ G07C 1/10 |
| 2020/0410278 A1 | 12/2020 | Nelson |
| 2021/0056509 A1 | 2/2021 | Lindy |

OTHER PUBLICATIONS

Final Office Action dated Jun. 10, 2022 for U.S. Appl. No. 17/462,091.
Notice of Allowance dated Aug. 17, 2022 for U.S. Appl. No. 17/462,091.

* cited by examiner

AUTOMATED INSPECTION SYSTEM AND METHOD

CROSS-REFERENCE TO RELATED APPLICATIONS

This application is a Continuation of Gerber et al., U.S. Pat. No. 11,546,507, issued on Jan. 3, 2023, and titled "Automated Inspection System and Method." The disclosure of which is incorporated by reference in its entirety.

TECHNICAL FIELD

This disclosure relates to improved automated systems and methods which guide, store, and catalogue rental inspections.

BACKGROUND

Documenting the state of a rental property, such as an apartment, prior to moving in can be a time-consuming and frustrating experience for tenants and landlords. Video documentation of the state of the apartment prior to move-in can be a way to establish near indisputable proof of the condition of the apartment. However, leaving this process to the tenant themselves, without assistance, presents several drawbacks, especially in the event of special provisions in the lease related to specific features of the rental property, such as appliances; outbuildings; or personal property belonging to the landlord stored on the property. Video footage captured by the tenant may not be sufficiently clear to establish the condition of the apartment; important features of the rental property may be left out of the footage; and such footage then needs to be stored in a way that is accessible to the tenant potentially many years after it was taken. Later, the tenant and landlord may waste time reviewing all of the footage just to find documentation of one particular feature of the property. Similar drawbacks apply to other means of documenting the state of a rental property, such as photos and audio descriptions, and, additionally, to documenting the state of other items that can be rented, such as cars, heavy equipment, hotel rooms, etc.

There is a need in the art for a system and method that addresses the shortcomings discussed above.

SUMMARY

In one aspect, a computer implemented method includes steps of receiving text of a lease for a rental property from a computing device, automatically analyzing the text, via a lease processing module, and identifying a lease feature described in the lease, and generating an instruction for a user to capture video of the rental property that includes the lease feature. The method also includes steps of sending the instruction to a guidance module of the computing device, receiving video of the rental property from the computing device, automatically analyzing a portion of the video, via an image processing module of the application, and identifying a video feature corresponding to the portion of the video. The method also includes steps of determining if the video feature matches the lease feature, and associating, in memory, the lease feature with the portion of the video when the video feature matches the lease feature.

In another aspect, a method implemented by an application running on a mobile computing device includes steps of receiving text of a lease for a rental property, receiving a set of lease features identified in the text of the lease, guiding a user, via a guidance module, through the rental property, prompting the user, via the guidance module, to capture video for each lease feature in the set of lease features, and receiving video of the rental property. The method also includes steps of receiving a set of video features identified in the video, comparing the set of lease features and the set of video features to determine if there is at least one video feature in the set of video features corresponding to each lease feature in the set of lease features, and instructing the user, via the guidance module, to continue capturing video until the application has received at least one video feature for each lease feature in the set of lease features.

In another aspect, a computing system includes a device processor and a non-transitory computer readable medium storing instructions that are executable by the device processor. The computing system also includes an application including a guidance module configured to guide a user on an inspection of a rental property, an image processing module configured to receive video and identify a set of video features, an audio processing module configured to receive audio and identify a set of audio features, and a lease processing module configured to receive text from a lease and identify a set of lease features. The application is further configured to determine that each video feature in the set of video features is matched to at least one audio feature in the set of audio features or to at least one lease feature in the set of lease features.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Embodiments disclosed herein include systems and methods that aid users in documenting the state of a rental asset using video footage and audio descriptions. As used herein, the term "rental asset" refers to any asset that can be rented, or leased, by a user. Examples of rentable assets include rental properties and rental vehicles.

The embodiments provide a software application that guides a user to record initial and final walkthrough videos, along with audio, of their rental property. The embodiments also provide a system that can scan a lease for the rental property, and extract and tag particular features of the document. The system can interpret portions of the lease that are relevant to particular items or components in the apartment (for example, major appliances) and guide the user to perform a comprehensive inspection of the items mentioned in the lease.

Videos and images are captured during the guided walkthrough and may be analyzed with machine learning systems to identify and categorize important features of the videos, such as appliances, flooring, and existing damage. To facilitate detection, tagging, and later retrieval, the system can use information extracted from the lease and/or information extracted from audio captured during the walkthrough.

Later, the user can then search these videos for the features to contest charges to their deposit with hard evidence. By entering in a search term related to the damage, such as "refrigerator", the exemplary system can identify every document (and where in the document) the search term is mentioned, and retrieve segments of video and/or audio that include images related to the search term.

The embodiments allow items or features specifically mentioned in the lease to be identified and recorded (with video or still images) so that this information can be retrieved at a later time. Moreover, extracting natural language information from the user's narration of the walkthrough can also be used to identify features in the video. This reduces the chance that the system will misidentify features from the video, or fail to detect and catalogue important features identified in the lease and/or explicitly mentioned by the user. For example, if the system does not detect a video feature corresponding to a previously identified item from the lease (such as "kitchen flooring"), the system can instruct the user to continue capturing video until it has detected images of the item that can be tagged and stored for later retrieval. Likewise, if the system does not detect a video feature corresponding to an item mentioned by the user during the walkthrough (for example, the user may say "look at that stain on the floor!"), the system can instruct the user to continue capturing video until it has detected images that are associated with the mentioned item.

In some embodiments, the system and method may make use of an application running on a computing device. As used herein, the term application ("app") shall mean a computing application running as software on a computing device, such as a personal computer, smartphone, laptop, tablet, or other computing device.

In one embodiment, a system assists users in documenting the state of a rental property. In some embodiments, an app scans a lease document for a rental property to identify specific features of the rental that require documentation. In some embodiments, machine learning modules in communication with or associated with the app and trained to associate specific written words or terms in a document with video imagery and/or audio descriptions identify such written words or terms in the lease document. In some embodiments, the app then tags, with the applicable word or terms, any portions of the lease including the applicable words or terms for recall at some later time.

Then, in some embodiments, the app directs the user through the rental property, identifying and cataloguing relevant features, as a result of analysis of the video footage or audio descriptions provided by the user. In some embodiments, machine learning modules trained to recognize features of the rental property, such as specific appliances, windows, items of furniture, etc., and common defects such items may have, such as cracks, stains, breakage, and so on, produce a set of tags identifying the relevant portions of the video footage and audio descriptions. In some embodiments, these tags include the feature of the rental property (e.g., a dishwasher) along with any defects it has identified (e.g., a missing knob) and the time(s) (expressed, for example, as a range) at which these features occur in the video footage and/or the audio description. In some embodiments, these tags additionally include categories to aid in the organization of the tag and to make searching through the documentation easier, so that, for example, "appliance" and "defect" could as well be assigned to the identified feature. In some embodiments, the user is prompted to continue taking video footage with audio descriptions of the rental property until the app has verified that all of the tags it has produced from analyzing the lease can be matched with corresponding video footage and/or audio descriptions. In some embodiments, at the completion of the inspection, the app directs the cloud storage of all of the video footage; all of the audio description; an image of the lease document as well as all the tags it has produced via video, audio, and textual analysis.

In some embodiments, at some later time, the user, via a search mechanism in the app, may search through all these tags for a specified feature of the rental property; for example, for a specific appliance. The app returns any video footage, audio descriptions, and portions of the lease to which the specified tag has been applied. In some embodiments, the user may search for more generic terms—such as "damage"—that a tag may be classified under by machine learning modules.

In an alternative embodiment, the inspection tour guided by the app precedes the app's analysis of the lease document. In some further embodiments, the app directs the user to take additional video footage and produce additional audio descriptions of any tags it has identified in the lease document to which it cannot assign video footage and audio descriptions of the inspection tour.

Figure 1:
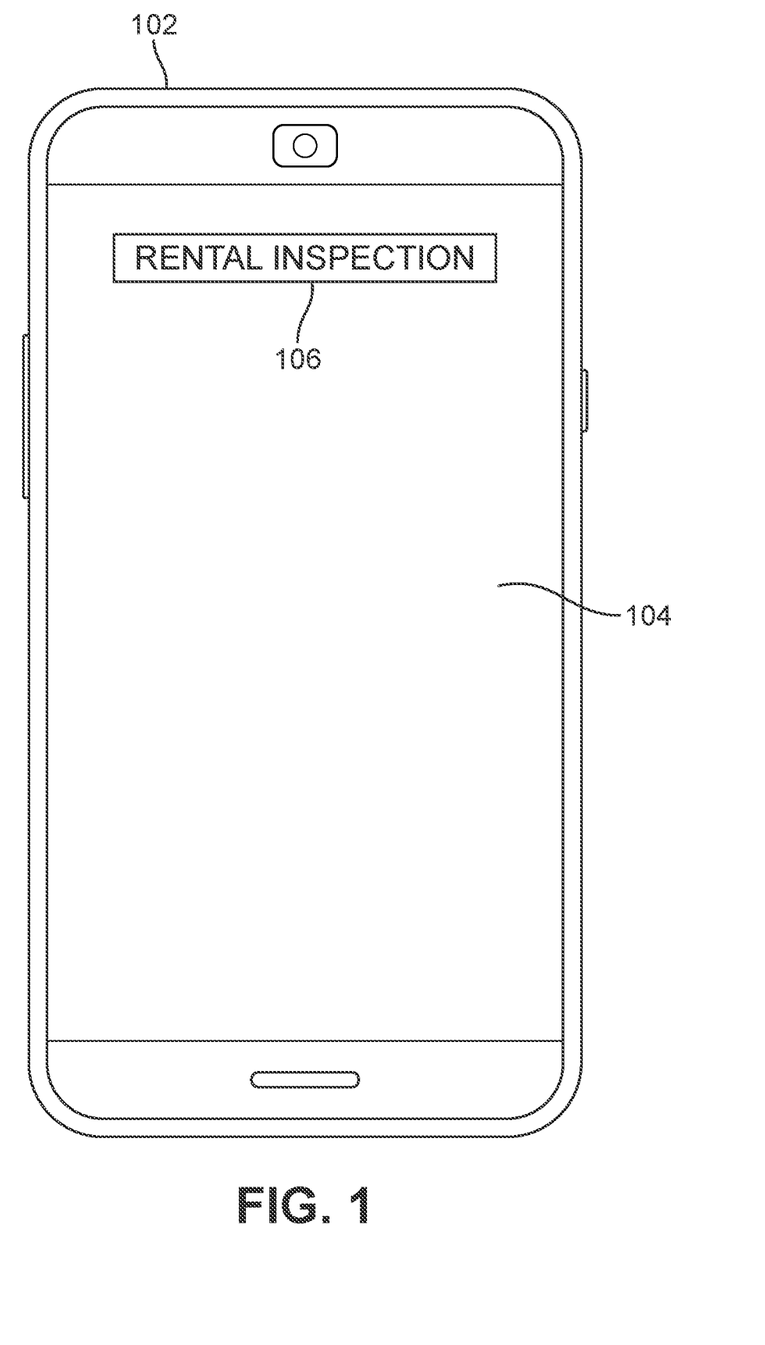
FIG. 1 is an exemplary illustration of a smartphone running a guided rental inspection app, according to an embodiment.

FIG. 1 is an exemplary illustration of a smartphone 102 running a guided inspection app 106, in an embodiment. In this embodiment, a user of smartphone 102 has opened app 106 to initiate guided inspection of a rental property. In this embodiment, rental inspection app 106 is a mobile phone software application that coordinates automated, guided inspection of the state of a rental property, including lease analysis; guidance for video and audio documentation of the rental; categorization of that data; and storage of that data. Smartphone 102 includes a display 104 for displaying a user interface, including displaying directions to aid the user in documenting the state of their rental.

Figure 2:
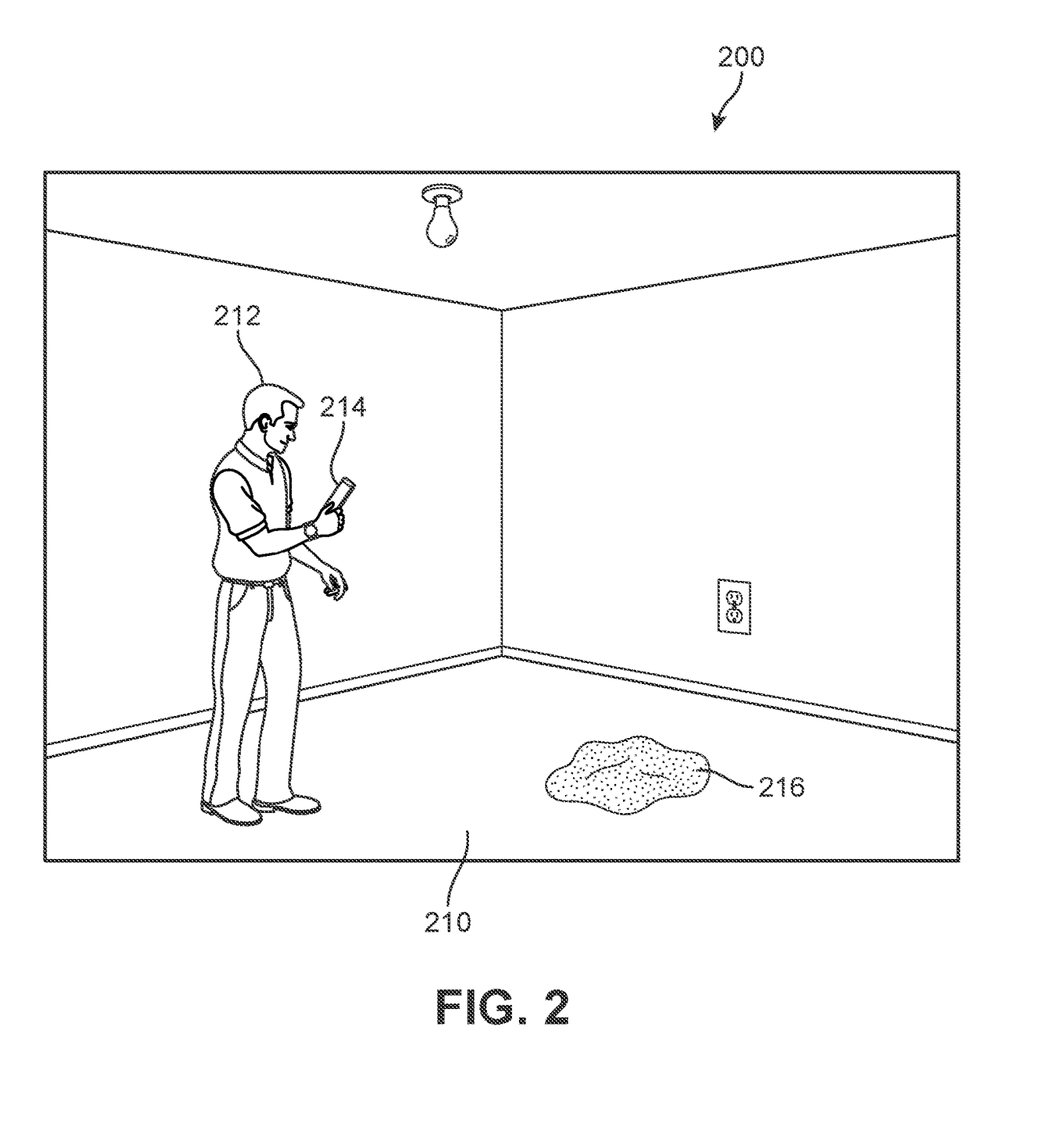
FIG. 2 is an exemplary illustration of a user guided by the rental inspection app of FIG. 1 documenting the state of an apartment, according to an embodiment.

FIG. 2 is an exemplary illustration of a user 212 guided by the rental inspection app of FIG. 1 documenting the state of an apartment 200, in one embodiment. User 212 uses smartphone 214, running the rental inspection app of FIG. 1, to focus on and take video documentation of a carpet stain 216 on the floor of apartment 200. In addition, user 212 uses smartphone 214, running the rental inspection app of FIG. 1, to record an audio description of carpet stain 216 on floor 210. The rental inspection app of FIG. 1, through the use of appropriate machine learning technology, recognizes the image of carpet stain 216. In some cases, the system may have previously analyzed the user's lease and extracted text requesting that the user should identify stains on any surfaces in the property. In some cases, the system may extract the word "stain" from recorded audio. In some cases, the system can then tag a portion of the video documenting carpet stain 216 based on existing tags determined through analysis of the lease and/or of the recorded audio. In some cases, the system tags the portion of the video documenting carpet stain 216 with appropriate key words and descriptive terms so this portion of the video can be recalled later. The rental inspection app of FIG. 1 as well tags the portion of the audio documenting carpet stain 216 with appropriate key words and descriptive terms so this portion of the audio can be recalled later.

Figure 3:
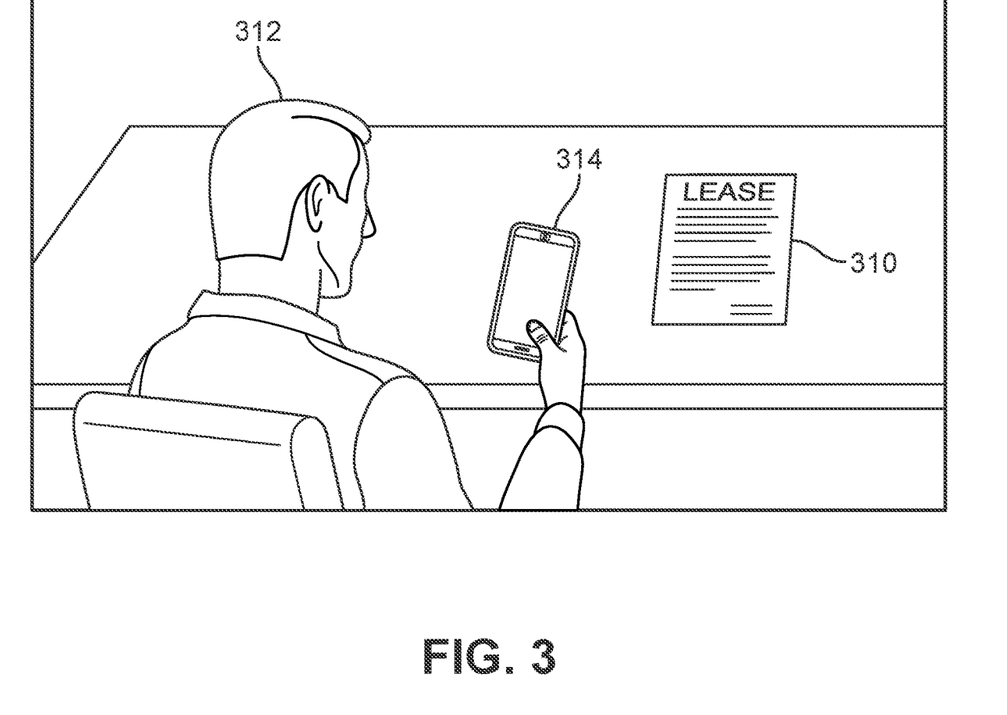
FIG. 3 is an exemplary illustration of a user storing an image of a lease, according to an embodiment.

FIG. 3 is an exemplary illustration of a user 312 storing an image of a lease 310. In an exemplary illustration, the rental inspection app of FIG. 1 has prompted user 312 to take a photographic image of lease 310 using a smartphone 314. The rental inspection app, through the use of machine learning technology, tags portions of the lease document to classify and thereby associate the tags with video and audio documentation of the related rental property. For example, in some embodiments, clauses in the lease document pertaining to pre-existing damage to the property would be tagged by the rental inspection app with the keyword "damage." Then, if portions of the audio or video documentation of the rental inspection show damage, they can be associated with those portions of the document. In some embodiments where the analysis of lease 310 precedes the rental inspection tour, tags produced by such lease analysis may influence how the app guides the user through the rental inspection tour. For example, the application could selectively guide the user through the rental property and have the user focus video and audio capture on particular features mentioned in the lease.

Figure 4:
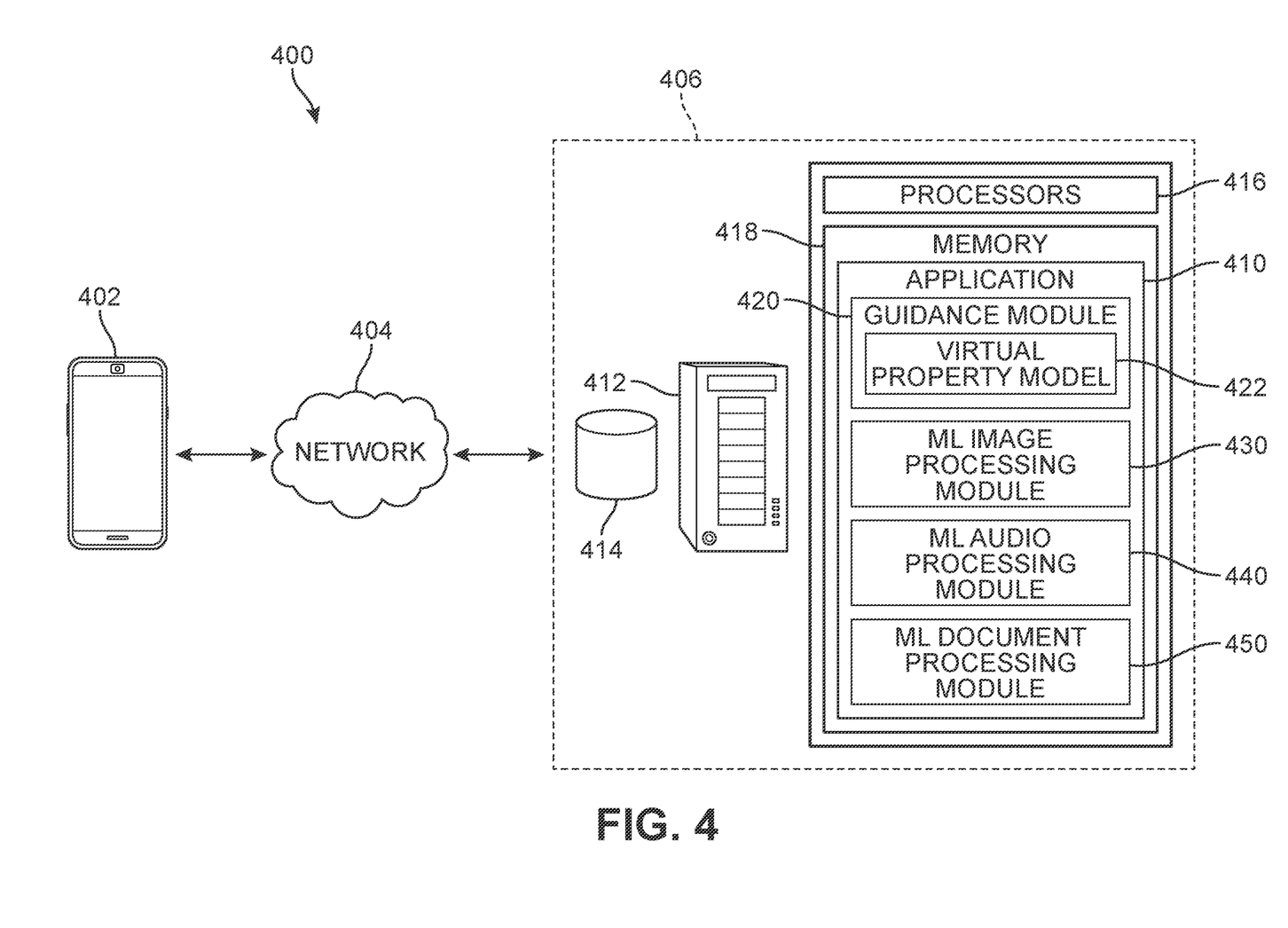
FIG. 4 is a schematic diagram of a system for guided rental inspections, according to an embodiment.

FIG. 4 is a schematic diagram of an application environment 400 implementing a system for guided rental inspections, according to one embodiment. In this embodiment, application environment 400 comprises a rental guidance application 410 ("application 410") that may include features operating on both smartphone 402 and on remote computing system 406, which communicate over a network 404. For clarity, the example of FIG. 4 illustrates a configuration where a frontend (or client-side) application is run on smartphone 402, while various processing modules are run on a backend hosted by remote computing system 406. In other embodiments, however, various processing modules could also run directly on smartphone 402.

Remote computing system 406 includes computing device 412. Computing device 412 incudes one or more processors 416 and memory 418. Application 410 may be stored in memory 418 and executed using processors 416.

Remote computing system 406 may also include one or more databases 414. In some embodiments, application 410 stores and manages access to any audio and video documentation produced during a rental inspection tour. Application 410 may also store and manage any lease documents associated with the rental. It may be appreciated that in some embodiments, other applications associated with remote computing system 406 may also have access to videos, audio, and/or lease information stored in databases 414. In some cases, application 410 may also store and manage user account information relating to the user of smartphone 402.

Application 410 may comprise various modules. As seen in FIG. 4, application 410 includes a guidance module 420. Guidance module 420 may be configured to provide instructions to a user that guide the user through a property and instruct the user to capture video and images. In some embodiments, guidance module 420 could provide generic instructions for guiding a user, based on general assumptions about a typical rental property. For example, the system could instruct a user to "go to the kitchen," and later instruct the user to "go to the master bedroom." In other embodiments, guidance module 420 could have information about the specific layout of a given property. For example, guidance module 420 could include a virtual property model 422 that acts as a map in guiding the user through specific locations of the particular property. Virtual property model 422 could be provided by a third party or could be automatically generated by guidance module 420 based on images captured by the user prior to a guided walkthrough.

In some embodiments, guidance module 420 not only instructs a user to go to certain places in a property, but also to capture video and/or images of specific features, including items, structures, and/or defects. For example, guidance module 420 could instruct a user to "record video and audio of refrigerator," "record video of kitchen floor," or "record video of any carpet stains in this room."

Guidance module 420 may also provide instructions to a user for capturing images of the lease for the rental property. For example, guidance module 420 could provide written or audible instructions explaining that the user should take images of each page of the lease. Alternatively, in embodiments where digital versions of the lease may be available, guidance module 420 may provide instructions for a user to digitally transfer the lease to the application. For example, guidance module 420 could instruct the user to upload the digital lease to the device running the application and/or to a system accessible to the application.

Application 410 may also include a machine learning (ML) image processing module 430. Image processing module 430 may be configured to receive images, such as still images, or sequences of images forming a video, and output relevant information about the images. This may include detecting objects in images, and/or classifying the status of known objects, as described in further detail below. Exemplary systems could implement any suitable machine learning systems and/or machine vision systems, and image/video annotation systems. In some cases, image processing module 430 may utilize various neural networks, including, for example, convolutional neural networks and generative adversarial networks.

Application 410 may also include a machine learning (ML) audio processing module 440. Audio processing module 418 may be configured to detect speech from audio and, in some cases, convert the detected speech into text that can be processed by a natural language processing (NLP) system. Exemplary systems for speech detection could implement Hidden Markov models, Dynamic time warping (DTW) methods, and/or neural networks to facilitate automated speech recognition. In some cases, audio processing module 430 may further include one or more natural language processing systems that facilitate speech recognition, as well as language understanding and language generation.

Application 410 may also include a machine learning (ML) document processing module 450. Document processing module 450 may implement suitable methods for processing documents and converting written/printed text into data that can be stored digitally. For example, using images captured by a mobile device's camera, document processing module 450 could detect a lease and extract text using optical character recognition or any other suitable methods for extracting text. In some cases, document processing module 450 may include its own language processing algorithms. In other cases, document processing module 450 could share access to natural language processing systems along with audio processing system 430. In some embodiments, document processing module 450 may specifically be a lease processing module, which is suitably designed to extract relevant information specific to leases.

The embodiments include systems that facilitate capturing information about features of a property that are subject to inspection. Such features can include, but are not limited to, floors, ceilings, walls, windows, window treatments, appliances, or other suitable features. For example, upon receiving video information captured by a user during a walkthrough of a rental property, the video information can be analyzed by image processing module 420. Image processing module 420 may apply one or more suitable machine learning models or other algorithms to identify and classify features in the video such as a "dishwasher," a "front door," a "master bedroom window," or other suitable features of the rental property that may be inspected for damage. To facilitate in identifying features from the video information, the system may further process audio information captured as the user narrates the walkthrough. For example, the system could analyze portions of the video associated with the time when the user says "here is the dishwasher" to help in identifying the dishwasher in the video. Likewise, the system could use keywords or tags identified in the lease to facilitate identifying those items within the video information. For example, if the lease contains the word "refrigerator," the system may attempt to extract images of a refrigerator from the video information.

The embodiments may also facilitate identifying the state of a feature, and in particular may facilitate identifying if a feature (such as an appliance) has any damage or defects. For example, imaging processing module 420 could identify various defects in features of the property such as "cracks", "stains," and "holes." Moreover, in some embodiments, different defects could be associated with different features. For example, if the system identifies a carpet, the system could further identify areas where the carpet is stained. For walls, the system could identify cracks, stains, or holes. For windows, the system may identify only cracks as possible defects, as an example.

Once features have been identified and classified, application 410 may generate tags. Tags may be in one-to-one correspondence with classifications, or could be generated using the classifications as input. For example, image processing module 420 may identify a dishwasher in a video and then generate a "dishwasher" tag. This tag may be associated with a particular timestamp in the video, so that if the user searches for "dishwasher" at a later time, a segment of video where the dishwasher is visible can be easily retrieved. In some cases, upon identifying particular defects in a feature, application 410 could generate tags for the defect class as well. For example, if a dishwasher has a crack in its front panel, the system could generate both a "dishwasher" tag and a "crack" tag.

In some embodiments, speech processing module 430 analyzes the audio transcript to aid in the identification of features and/or defects. In some embodiments, speech processing module 430 checks for the presence in the audio transcript of words used to characterize defects or damage, to establish the presence of the defect class, to a certain confidence. For example, if speech processing module 430 finds the word "damage" in the audio transcript, in some embodiments, this increases the chances that it will tag a feature in the associated video documentation as, for example, a "crack" or "hole".

Tagging may also be performed on terms extracted from a lease. For example, if application 410 analyzes a lease and identifies a clause about "documenting carpet stains," the system could generate a tag for "carpet stains." The tag could then be associated with the location of that clause in the lease. Thus, if a user searches for "carpet stains" at a later time, the system can retrieve the exact clause in the lease related to carpet stains, as well as any video footage documenting any carpet stains found during the initial or final walkthroughs.

In some embodiments, some or all of the analysis performed by various modules may be performed by computing device 412. However, in other embodiments, the system could leverage external sources for some kinds of analyses, such as services that have been designed to analyze and annotate documents and/or other types of media. In some cases, one or more modules could be configured with application program interfaces (APIs) to communicate with external sources.

Figure 5:
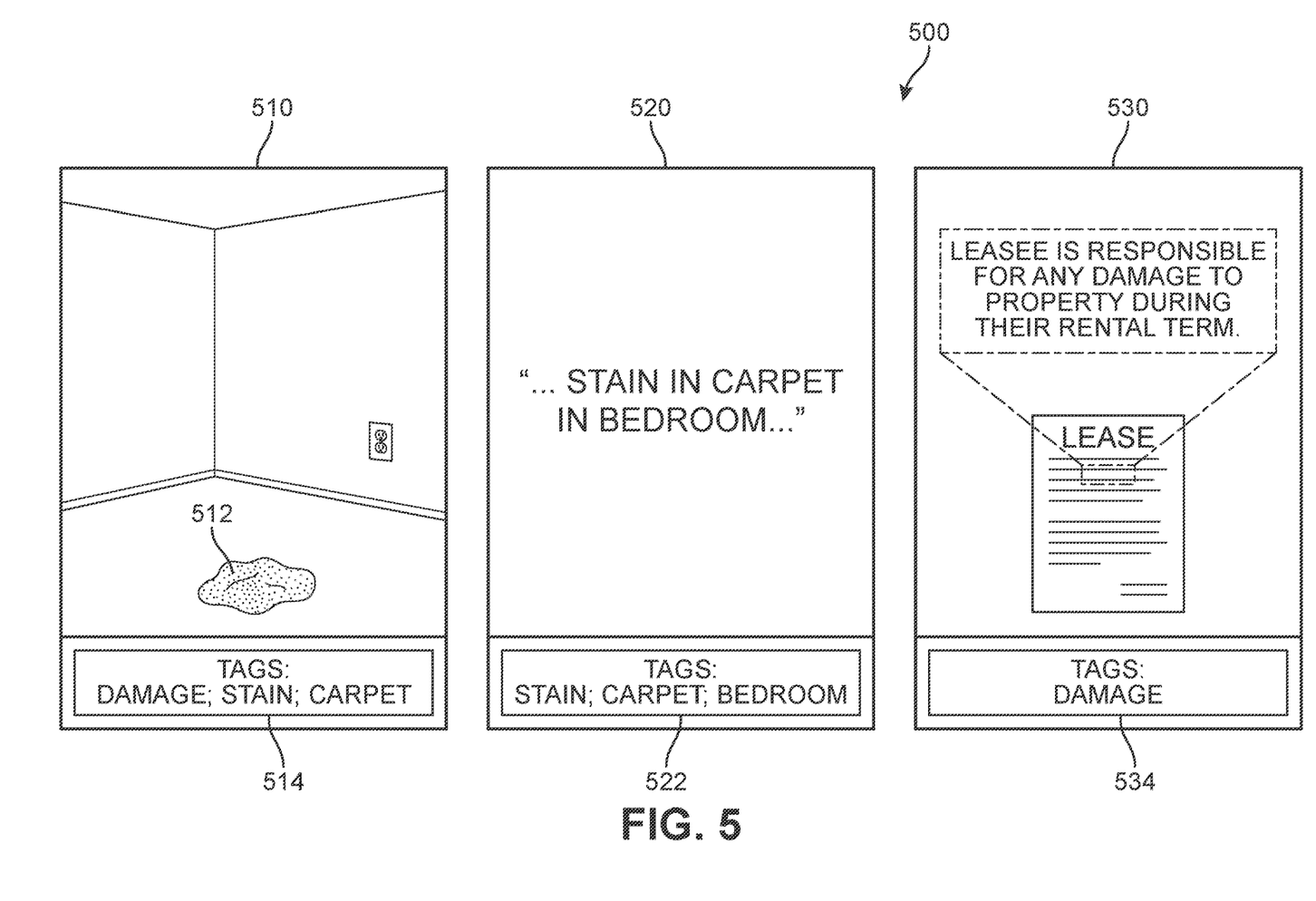
FIG. 5 is an exemplary illustration of file tags produced by a system for guided rental inspections, according to an embodiment.

FIG. 5 is an exemplary embodiment where an application has analyzed information from different sources and generated associated sets of tags. In this case, an image 510 (captured as part of a video) has been analyzed to identify a first set of tags 514. Also the transcript of an audio file 520 (captured simultaneously with the video) has been analyzed to identify a second set of tags 522. Also, an excerpt from a lease 530 has been analyzed to identify a third set of tags 534.

In this embodiment, image 510 shows a view of a room in a rental apartment in which there is a stain 512 on the room's carpeting. Based on analysis of image 510, the application generates first set of tags 514. In this embodiment, the image processing module of the system for guided rental inspections has been trained to recognize the image of stain 512 as an image belonging to a pre-defined class termed "stain". In this embodiment, the image processing algorithm therefore tags video file 510 with the term "stain". In this embodiment, producing such a tag includes appending to the complete video file from which video file 510 is taken the time at which this excerpt occurs and the set of tags 514, which include the term "stain"; the identified element which contains this stain—in this case, "carpet"; and any further classifications that the image processing algorithm applies to the term "stain." In this embodiment, the further classification is "damage."

In this embodiment, audio file 520 includes an audible description of a stain in the carpet in the bedroom. Based on analysis from an audio processing module, the application identifies the words "bedroom," carpet," and "stain." These words are then used as second set of tags 522.

In this embodiment, lease 530 includes a written description of the leasee's responsibility for any damage to the property. Therefore, the application generates third set of tags 534, including the term "damage."

Figure 6:
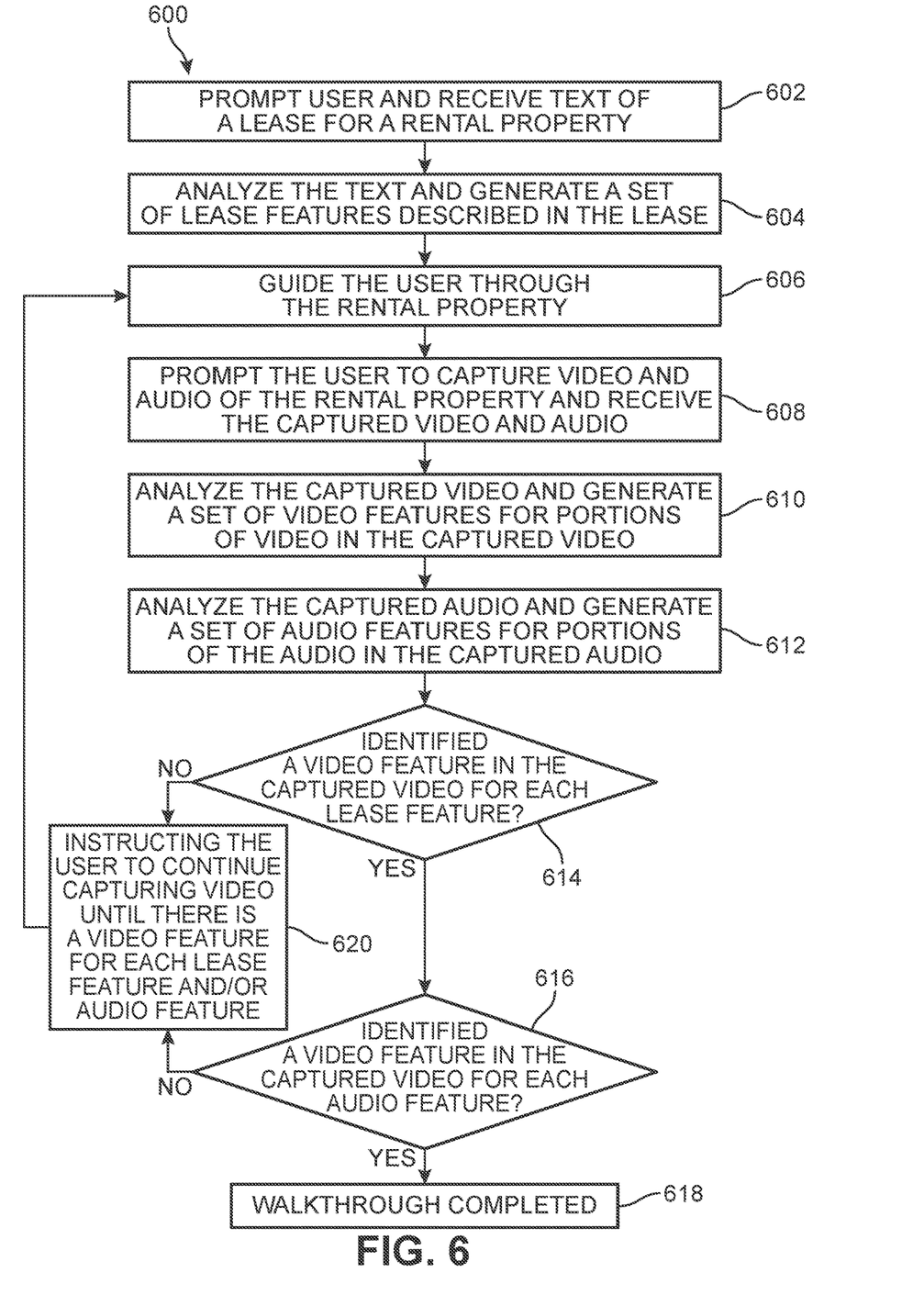
FIG. 6 is a flowchart illustrating a method for guided rental inspections, according to an embodiment.

FIG. 6 is a flowchart 600 illustrating the general outline of a method for guided rental inspections, in an embodiment. In some embodiments, one or more of the following steps could be performed by an application running on a mobile device. In some cases the process is initiated when a user initiates a request for a guided rental inspection via an app on his or her mobile device. In step 602, in this embodiment, the system prompts the user to display a lease for the rental property and takes a photographic image of the lease to produce a lease document file. Next, in step 604, the system scans the lease document file to identify specific lease features of the rental that require documentation in order to ensure the user is properly guided during the documentation process. As used herein, the term "lease feature" refers to any word, phrase, or other semantic information that can be used to characterize aspects of the rental property that should be documented by a user. In this embodiment, the systems tags any portions of the lease pertaining to the rental inspection process. In some embodiments, such portions include parts of the lease pertaining to damage or defects in the rental property.

In step 606, in this embodiment, the system instructs the user to move through the entirety of the rental property while the system provides guidance. In step 608, the system prompts the user to take video and/or provide an audible description of their location as well as any notable features. Exemplary notable features include, but are not limited to, appliances, fixtures, items of furniture and/or any other notable features. In some cases, the system may prompt the user to capture video and audio for features identified in the set of lease features. In the exemplary embodiment, the system waits to check for video of all the lease features until the user has captured some video and audio.

In some embodiments, the system instructs the user to move closer and/or focus on features of the rental property its machine algorithms cannot recognize. In some embodiments, once the system has determined that the user has produced a 360-degree view of the room the user currently occupies, it instructs the user to move on to the next room. In some embodiments, the system instructs the user to produce video and audio documentation of any specific elements it has recognized in the lease that it does not recognize in any of the video documentation produced by the user.

In step 610, the system analyzes any captured video and audio of the rental property and generates a set of video features for portions of video in the captured video. Next, in step 612, the system analyzes any captured audio and generates a set of audio features for portions of audio in the captured audio.

In step 614, the system determines if a corresponding video feature has been identified for each of the lease features generated in step 604. If there are still lease features for which no corresponding video features have been found, the system proceeds to step 620. In step 620 the system instructs the user to continue capturing video until there is a video feature for each lease feature and/or audio feature. The system therefore returns to step 606 to continue guiding the user through the property and analyzing captured video and audio.

In some embodiments, the system could explicitly tell the user to capture video of a specific lease and/or audio feature that has yet to be captured on video. For example, if the system has a "washing machine" lease feature, but has not yet identified a washing machine in any video, the system can explicitly instruct the user to "capture video of the washing machine."

If, in step 614, the system determines there is a corresponding video feature for each lease feature, the system proceeds to step 616. In step 616, system determines if a corresponding video feature has been identified for each of the audio features generated in step 614. If not, the system proceeds to step 620. Otherwise, the system proceeds to step 618 where the system determines that the walkthrough is complete.

Figure 7:
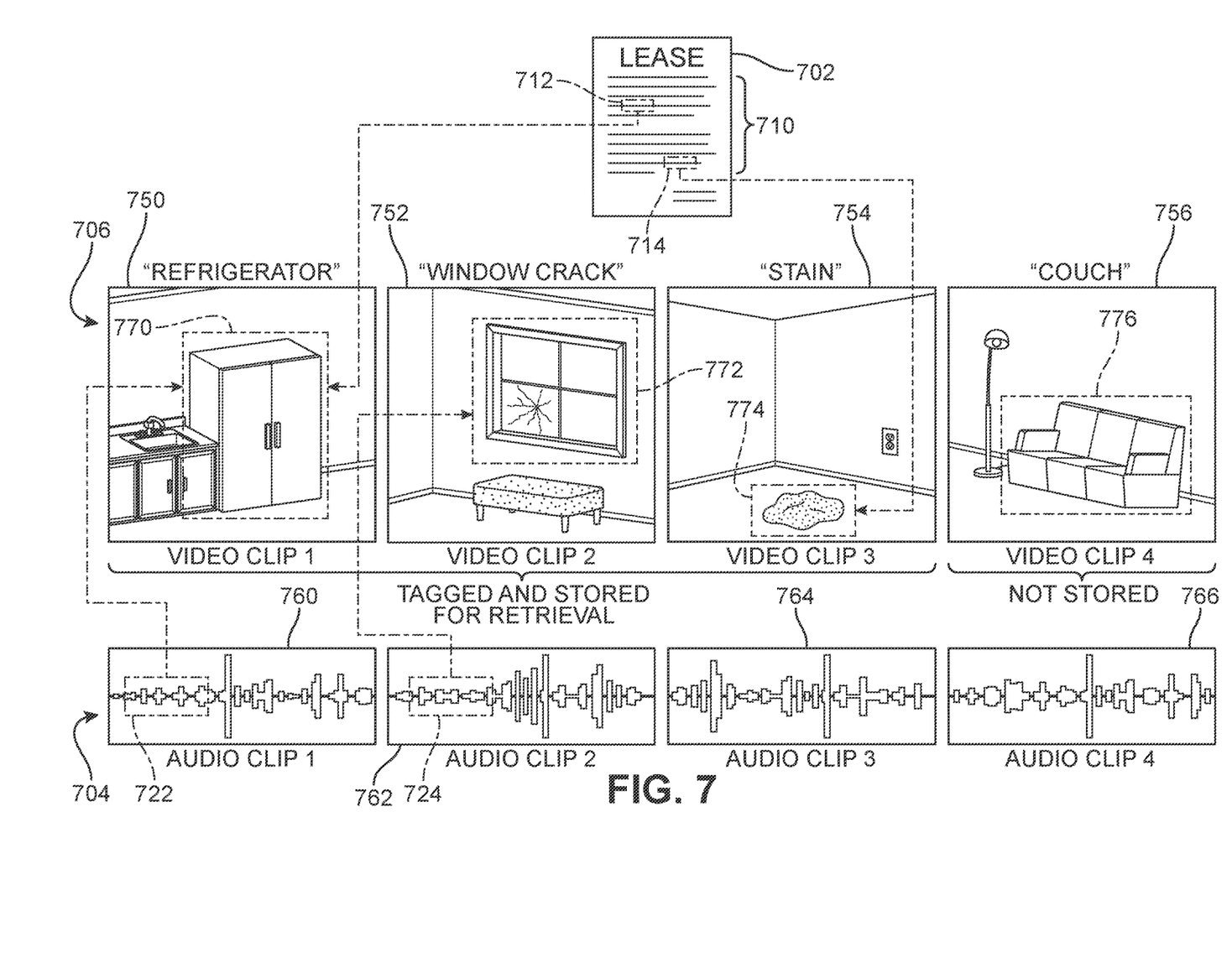
FIG. 7 is an exemplary illustration of a set of video clips with tagged features using extracted lease and extracted audio information, according to an embodiment.

FIG. 7 is a schematic view showing the use of information extracted from a lease 702 and from an audio file 704 to tag relevant features detected in a video file 706. It may be appreciated that lease 702 includes information about a particular rental property, and may include information about potential liability for various items and structures associated with the rental property (such as walls/floors/ceilings, appliances, windows, and furniture).

Video file 706 includes video captured by a user (using a smartphone, for example) during a guided walkthrough of the rental property. For purposes of simplifying analysis and video retrieval, video file 706 has been segmented into multiple portions of video, also referred to as "video clips." In this case, video file 706 has been segmented into a first video clip 750, a second video clip 752, a third video clip 754, and a fourth video clip 756. Videos can be segmented based on fixed intervals of time, or using contextual information within the video that may represent the background or view of the video has changed.

Audio file 704 includes audio captured by the user during the guided walkthrough of the rental property. For purposes of simplifying analysis and audio retrieval, audio file 704 has been segmented into multiple portions of audio, also referred to as "audio clips." In this case, audio file 704 has been segmented into a first audio clip 760, a second audio clip 762, a third audio clip 764, and a fourth audio clip 766. Audio files can be segmented based on fixed intervals of time, or using contextual information within the audio file. Moreover, in some cases, audio files may be segmented so that the audio clips are in one-to-one correspondence with the video clips, as in FIG. 7.

In this example, an application can identify and classify lease features from text 710 of lease 702. In FIG. 7, the application has identified a first lease feature 712 (the text "refrigerator") and a second lease feature 714 (the text "carpet stains") within lease 702. Additionally, the application can identify and classify audio features from audio information contained within audio file 704. In particular, the application has identified a first audio feature 720 (the audible word "refrigerator") and a second audio feature 722 (the audible phrase "crack in window").

In some embodiments, the lease features and/or audio features, which may be considered as tags for the lease and audio file, respectively, can be used to tag appropriate video features identified by the application. In particular, in some cases, the application may only tag and store video clips for later retrieval when the classified video feature corresponds with one or more of the lease tags and/or audio tags. This improves the accuracy of the video analysis by using lease tags and/or audio tags to corroborate classifications of features based on image analysis. Furthermore, it helps ensure only video clips that show features relevant for the lease or features explicitly mentioned by the user are tagged and stored for later retrieval, since it would not be efficient to tag and store all possible features in a video.

As seen in FIG. 7, the application has identified and classified a video feature for each of the four video clips. Specifically, the application has identified a first video feature 770 ("refrigerator") within first video clip 750, a second video feature 772 ("window crack") within second video clip 752, a third video feature 774 ("stain") within third video clip 754, and a fourth video feature 776 ("couch") within fourth video clip 756. As seen in FIG. 7, the first three video features are further corroborated by corresponding lease tags and/or audio tags. For example, first lease feature 712 and first audio feature 720 both match first video feature 770. Likewise, second audio feature 722 matches second video feature 772. Furthermore, second lease feature 714 matches third video feature 774. Based on these matches, the application may tag each video clip using the corresponding lease and/or audio tags, and then store the tagged video clips for later retrieval. As used herein, the term "tag" refers to any suitable operation of associating or linking video clips (or portions of video) with any suitable features, such as lease features and audio features. It may be appreciated that storage may be done in any suitable manner, and tagging, linking, or otherwise associating features with portions of a video may correspond to generating relevant pointers, or indexes, in memory.

By contrast, fourth video feature 776 does not match any of the lease features or any of the audio features. This gives the application high confidence that the identified feature (in this case, a "couch") need not be captured, tagged, and stored for later retrieval, as it is not referenced in the lease or explicitly by the user. Such a situation could occur, for example, if the furniture is owned by the user and not by the leasing party.

As seen in the example of FIG. 7, the application can use lease features, audio features, and/or a combination of lease features and audio features to corroborate video features that have been identified by an image processing module. This provides a robust approach to tagging videos for later retrieval, as tagging data can be confirmed or even generated by leveraging information extracted from written text in a lease and/or narration during the walkthrough from the user.

Figure 8:
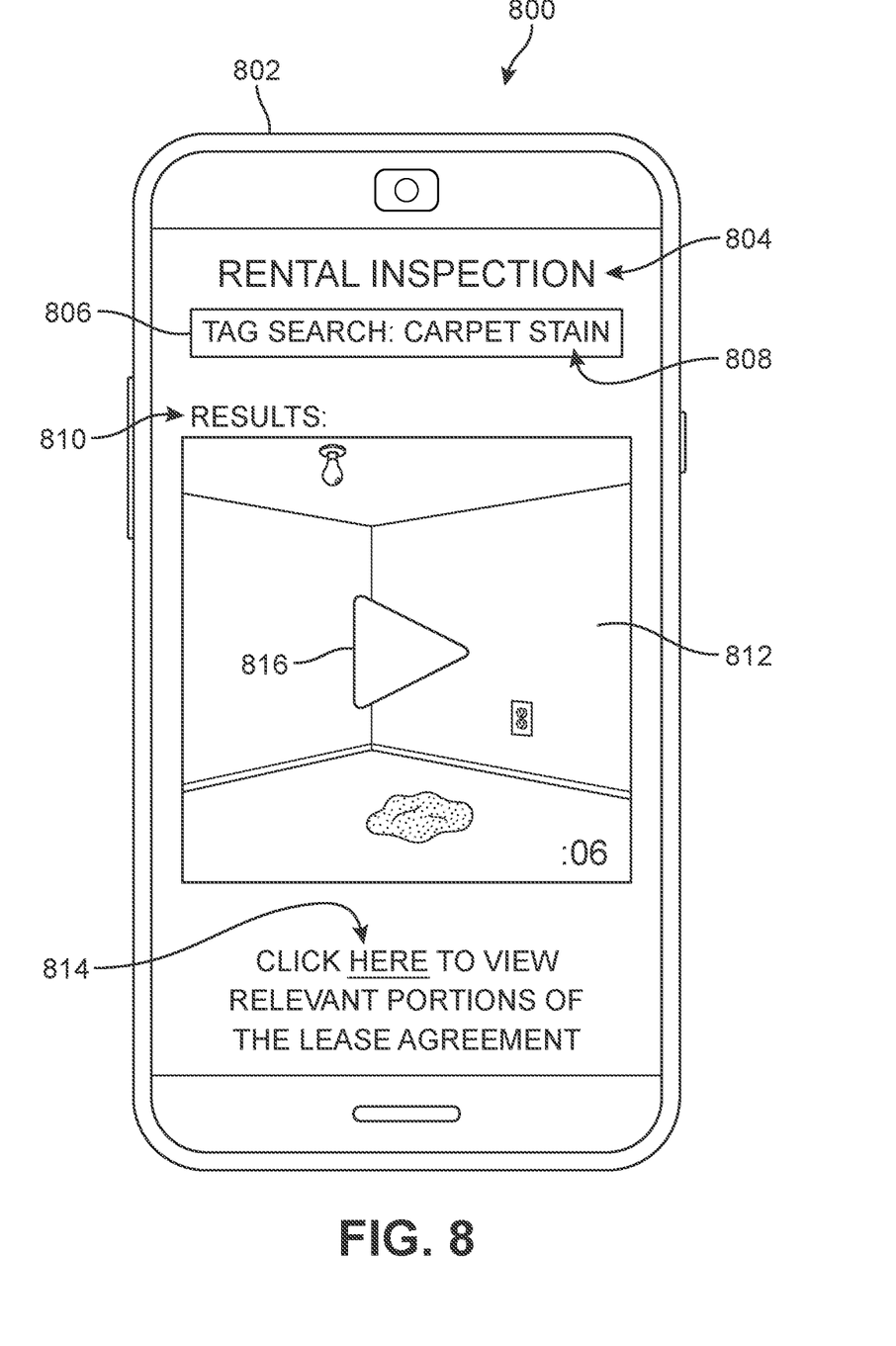
FIG. 8 is an exemplary illustration of a mobile application view, according to an embodiment.

FIG. 8 is an exemplary view of an application view 800, according to an embodiment. Within application view 800, a user can search stored rental inspection documentation for specified file tags. In this embodiment, the user, via a rental inspection app 804 running on smartphone 802, has taken video and audio documentation of a rental property and wishes to search this documentation to find excerpts of this documentation showing a carpet stain. In this embodiment, rental inspection app 804 includes a search function bar 806 which allows the user to search for excerpts of the video and audio documentation and a lease document based on the tags appended to them. In this embodiment, the user enters search terms 808 ("carpet stain") into search function bar 806. In this embodiment, app 804 searches the tags applied to the video and audio documentation and displays, in a results section 810, video and audio excerpts 812 associated with those tags. In this embodiment, the user can play these video and audio excerpts by pressing a "play" button 816. In this embodiment, portions of a lease document associated with the rental property have been tagged by textual analysis algorithms to identify and classify portions relevant to rental inspection documentation. In this embodiment, any sections of the lease document whose tags are associated with the search terms can be viewed by selecting lease excerpt link 814.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, python, java, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer implemented method, comprising:
   receiving a lease for a property from a mobile device;
   deriving a set of lease features from the lease using natural language processing performed by a lease processing module;
   identifying a lease feature from the set of lease features;
   generating an instruction for a user of the mobile device to capture video of the property that includes the lease feature;
   sending the instruction to the mobile device;
   receiving the video of the property from the mobile device;
   identifying a set of video features corresponding to portions of the video;
   identifying a video feature from the set of video features using an image processing module;
   wherein the video feature matches the lease feature;
   identifying a portion of the video corresponding to the video feature;
   storing a lease tag associating the lease feature with the portion of the video for subsequent retrieval;
   receiving audio associated with the video of the property from the mobile device;
   identifying a set of audio features in the audio corresponding to portions of the audio;
   identifying an audio feature from the set of audio features, using an audio processing module;
   wherein the video feature matches the audio feature;
   storing an audio tag associating the audio feature with the portion of the video for subsequent retrieval;
   receiving a keyword from the user;
   retrieving a portion of the video associated with the keyword using at least one of the lease tag and the audio tag; and
   providing the portion of the video associated with the keyword to the user.

2. The method according to claim 1, further comprising:
   discarding an unused portion of the video of the property for which there is no lease feature corresponding to the unused portion of the video of the property and no audio feature corresponding to the unused portion of the video of the property.

3. The method according to claim 1, wherein:
   at least one lease feature from the set of lease features is used to provide guidance instructions configured to help a user move about the property.

4. The method according to claim 1, further comprising:
   retrieving a portion of the audio associated with the keyword using the audio tag; and
   providing the portion of the audio associated with the keyword to the user.

5. The method according to claim 1, further comprising:
   retrieving a portion of the lease associated with the keyword using the lease tag; and
   providing the portion of the lease associated with the keyword to the user.

6. The method according to claim 1, wherein the video is segmented into portions of video based on contextual information related to changes in the video and the audio is segmented into portions of audio based on contextual information related to changes in the audio.

7. The method according to claim 1, further comprising:
   sending instructions to the mobile device to continue capturing video until the mobile device confirms that a video feature matches the lease feature;
   wherein the mobile device confirms that the video feature matches the lease feature using machine vision.

8. A computer implemented method, comprising:
   receiving a lease for a property;
   identifying a set of lease features in the lease using natural language processing to identify features of the property to be documented;
   sending an instruction to a guidance module to guide a user of a mobile device through the property;
   prompting the user to capture video for at least one lease feature in the set of lease features;
   receiving video of the property;
   identifying a set of video features corresponding to portions of the video;
   determining, for at least one video feature from the set of video features, a corresponding lease feature;
   identifying a corresponding portion of the video corresponding to the at least one video feature;
   storing a lease tag associating the corresponding lease feature with the corresponding portion of the video for subsequent retrieval;
   receiving audio associated with the video of the property;
   identifying a set of audio features corresponding to portions of the audio;
   determining, for the at least one video feature, a corresponding audio feature;
   storing an audio tag associating the corresponding audio feature with the corresponding portion of the video for subsequent retrieval;
   receiving a keyword from the user;
   retrieving a portion of the video associated with the keyword using at least one of the audio tag and the lease tag to retrieve the portion of the video associated with the keyword; and
   providing the portion of the video associated with the keyword to the user.

9. The method according to claim 8, further comprising identifying the set of audio features using automated speech recognition to convert the captured audio into text corresponding to the captured audio and using natural language processing to identify the text corresponding to the captured audio.

10. The method according to claim 8, further comprising:
    comparing the set of lease features and the set of video features to determine if there is at least one video feature in the set of video features corresponding to at least one lease feature in the set of lease features; and instructing the user, using the guidance module, to continue capturing video until the guidance module confirms that it has received the at least one video feature corresponding to the at least one lease feature in the set of lease features by confirming that at least one video feature matches at least one corresponding lease feature using machine vision.

11. The method according to claim 8, further comprising retrieving a portion of the audio associated with the keyword using the audio tag and providing the retrieved portion of the audio associated with the keyword to the user.

12. The method according to claim 8, further comprising retrieving a portion of the lease associated with the keyword using the lease tag and providing the portion of the lease associated with the keyword to the user.

13. A computing system, comprising:
a guidance module configured to guide a user on an inspection of a property;
an image processing module configured to receive video during the inspection and identify video features corresponding to portions of video produced by segmenting the video;
wherein the video is segmented into the portions of video based on contextual information related to changes in the video;
an audio processing module configured to receive audio during the inspection and identify audio features corresponding to portions of audio produced by segmenting the audio;
a lease processing module configured to receive a lease for the property and analyze the lease using natural language processing to identify a set of lease features of the property to be documented; and
a processor configured to:
determine, for at least one video feature, a corresponding lease feature;
identify a corresponding portion of the video corresponding to the at least one video feature;
store a lease tag associating the corresponding lease feature with the corresponding portion of the video for subsequent retrieval;
determine, for the at least one video feature, a corresponding audio feature;
store an audio tag associating the corresponding audio feature with the corresponding portion of the video for subsequent retrieval;
receive a keyword from the user;
retrieve a portion of the video associated with the keyword using at least one of the lease tag and the audio tag to retrieve the portion of the video associated with the keyword; and
provide the portion of the video associated with the keyword to the user.

14. The computing system according to claim 13, wherein the processor is further configured to:
retrieve a portion of the audio associated with the keyword using the audio tag; and
provide the portion of the audio associated with the keyword to the user.

15. The computing system according to claim 13, wherein the processor is further configured to:
retrieve a portion of the lease associated with the keyword using the lease tag; and
provide the portion of the lease associated with the keyword to the user.

16. The computing system according to claim 13, wherein the processor is further configured to discard an unused portion of the video for which there is no lease feature corresponding to the unused portion of the video and no audio feature corresponding to the unused portion of the video.

17. The computing system according to claim 13, wherein the processor is further configured to instruct the user, using the guidance module, to continue capturing video until the processor confirms that it has received at least one video feature for at least one lease feature in the lease features by confirming that at least one video feature matches at least one lease feature using machine vision.

18. The computing system according to claim 13, wherein the audio is segmented into the portions of audio based on contextual information related to changes in the audio.

19. The computing system according to claim 13, wherein at least one portion of audio is in one-to-one correspondence with a corresponding portion of video.

20. The computing system according to claim 13, wherein the image processing module uses machine vision and the audio processing module uses speech recognition.

\* \* \* \* \*